2,561,283

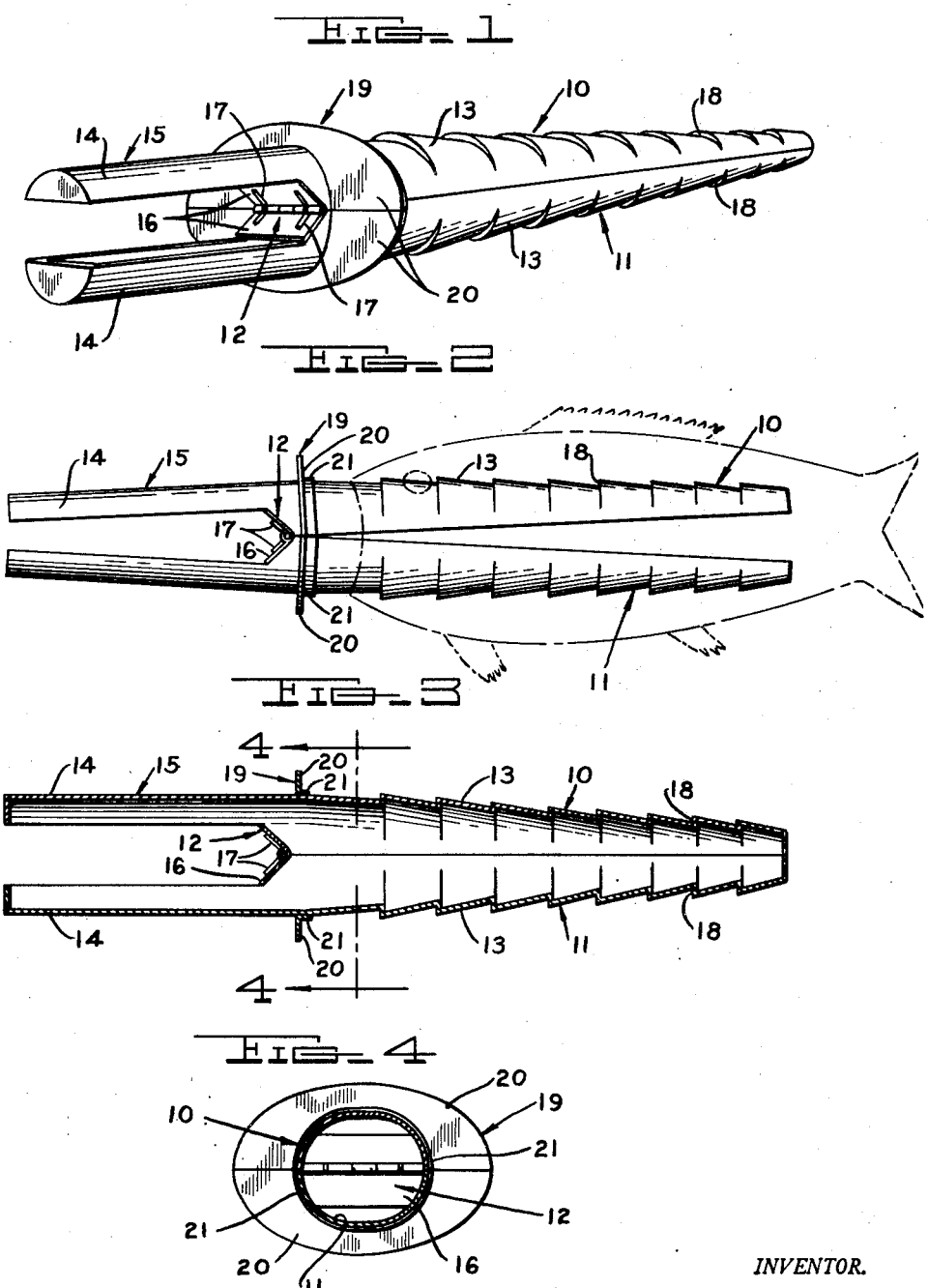
July 17, 1951 — A. Y. LESLIE — 2,561,283
FISH HOLDING IMPLEMENT
Filed Jan. 20, 1947
INVENTOR.
ARTHUR Y. LESLIE
ATTORNEYS Patented July 17, 1951

UNITED STATES PATENT OFFICE 2,561,283

FISH HOLDING IMPLEMENT

Arthur Y. Leslie, Detroit, Mich.

Application January 20, 1947, Serial No. 723,053

2 Claims. (Cl. 17—7)

This invention relates to improvements in fish holding implements of the type employed in handling fish when removing the scales, fins and the like.

One of the objects of this invention is to provide a simple, inexpensive implement capable of being readily attached to a fish and having provision for firmly supporting the fish during the scaling and cleaning operation.

Another object of this invention is to provide a fish holding implement having an expansible portion capable of being easily inserted into a fish through the mouth of the latter when in a contracted position and having means for firmly gripping adjacent portions of the fish when expanded.

Still another object of this invention is to provide a fish holding implement of the above general type wherein the expansible portion is tapered in a manner to fit fish of various different shapes and sizes.

A further object of this invention is to provide a fish supporting implement having a handle for manipulating the expansible portion and having a guard located between the handle and expansible portion to protect the user's hand during the scaling operation.

The foregoing as well as other objects will be made more apparent as this description proceeds especially when considered in connection with the accompanying drawing wherein:

Figure 1 is a perspective view of a fish holding implement constructed in accordance with this invention;

Figure 2 is a perspective view showing the implement in operation;

Figure 3 is a longitudinal vertical mid-sectional view through the implement shown in Figure 1; and Figure 4 is a cross sectional view taken substantially on the plane 4—4 of Figure 3.

The fish holding implement illustrated in the several figures of the drawings may be formed in any suitable manner from any one of a number of different metals or may be fashioned from wood or equivalent materials. In any case, the implement comprises essentially two elongated complementary sections 10 and 11 connected intermediate the ends by a hinge 12.

As shown particularly in Figure 4 of the drawing each section is substantially semi-circular in cross section and the portions 13 of the sections at one side of the hinge cooperate with one another to form a tube when in their closed or contracted positions. The portions 14 at the opposite side of the hinge are spaced laterally from each other and provide a handle 15. The hinge 12 may be of the butt type and is located between the handle portions 14 with the plates 16 respectively welded or otherwise secured to the two sections. Suitable springs 17 may be provided at opposite ends of the hinge 12 for normally urging the handle portions 14 in spaced apart relationship and the portions 13 in their contracted or engaged positions.

When the portions 13 are in their normal or contracted positions they may be readily inserted into the mouth of a fish so as to extend substantially the entire length of its body. The cross sectional area of the portions 13 gradually diminishes from the hinge 12 to the free ends of said portions to not only facilitate insertion of the implement into a fish but to also enable successful use of the implement for holding fish of a wide variety of sizes and shapes. After the portions 13 have been properly inserted into a fish the handle portions 14 are squeezed together to expand the portions 13 into gripping engagement with adjacent parts of the fish. The gripping action of the portions 13 on the fish is greatly facilitated by providing teeth or serrations 18 on the outer surfaces of the portions. It will be observed from Figures 1 and 2 of the drawings that the nature of the teeth or serrations 18 is such as to materially resist withdrawal of the implement from the fish without appreciably interfering with insertion of the contracted portions 13 into the fish.

In fact the gripping action exerted on the fish by the portions 13 when expanded is sufficient to hold the fish against movement relative to the implement by the force exerted on the fish during removal of the scales. The scales are, of course, removed by scraping a suitable tool lengthwise of the fish toward its head or, in other words, towards the handle 15. Inasmuch as the handle 15 is gripped by the other hand of the user it is desirable to protect this hand from the scale removing tool and this is accomplished by providing a guard 19 on the implement between the handle 15 and portions 13. The guard 19 comprises a pair of plates 20 having flanges 21 respectively welded or otherwise secured to the sections 10 and 11 adjacent the hinge 12.

What I claim as my invention is:

1. A device for rigidly holding fish while removing the scales comprising a pair of sections, means pivotally connecting the sections together intermediate the ends thereof, elongated portions at one side of the pivotal connection having outer surfaces converging toward the free ends of said portions and adapted to be inserted into the mouth of a fish with the elongated portions extending substantially the entire length of the latter, laterally spaced handle portions at the opposite side of the pivotal connection for expanding the converging portions, and a guard secured to the sections between the handle portions and converging portions.

2. A device for rigidly holding fish while removing the scales comprising a pair of complementary sections, means pivotally connecting the sections together intermediate the ends thereof, elongated portions at one side of the pivotal connection having serrated outer surfaces converging toward the free ends of said portions and adapted to be inserted into the mouth of a fish, said elongated portions being of sufficient length to extend substantially the entire length of a fish when inserted therein, laterally spaced handle portions at the opposite side of the pivotal connection and movable toward one another to move the serrated converging portions outwardly into gripping engagement with the inside of the fish, spring means normally resisting outward movement of the converging portions, and flanges extending outwardly from the sections between the handle portions and converging portions to provide a hand guard.

ARTHUR Y. LESLIE.

REFERENCES CITED

The following references are of record in the file of this patent:

UNITED STATES PATENTS

| Number | Name | Date |
|---|---|---|
| 459,933 | Lippert | Sept. 22, 1891 |
| 2,015,262 | Flagg et al. | Sept. 24, 1935 |
| 2,142,197 | Lee | Jan. 3, 1939 |
| 2,298,580 | Miron | Oct. 13, 1942 |
| 2,334,781 | Maines | Nov. 23, 1943 |